United States Patent
Johannsen

(10) Patent No.: US 11,972,646 B2
(45) Date of Patent: Apr. 30, 2024

(54) DETECTING SPROCKET SEGMENT WEAR BASED ON MACHINE DRIVETRAIN DATA

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 17/644,581

(22) Filed: Dec. 16, 2021

(65) Prior Publication Data

US 2023/0196852 A1    Jun. 22, 2023

(51) Int. Cl.
*G07C 5/08* (2006.01)
*B62D 55/12* (2006.01)
*B62D 55/18* (2006.01)

(52) U.S. Cl.
CPC ........... *G07C 5/0808* (2013.01); *B62D 55/12* (2013.01); *B62D 55/18* (2013.01); *G07C 5/0816* (2013.01)

(58) Field of Classification Search
CPC .......... G07C 3/12; G07C 5/006; G07C 5/008; G07C 5/0808; G07C 5/0816; G62D 55/12; G62D 55/14; G62D 55/18; G62D 55/21; G06N 5/003; G06N 20/00; G01M 13/00; G01M 17/00; G06F 17/14; G06F 17/142; E02F 3/76; E02F 9/26; B60W 20/40; B60W 20/50; H04W 4/40; H04L 12/40; E01C 19/4873; B60Q 9/00
USPC ...................................................... 701/29.4
See application file for complete search history.

(56) References Cited

U.S. PATENT DOCUMENTS

| | | |
|---|---|---|
| 5,348,515 A | 9/1994 | Miller |
| 9,169,623 B2 | 10/2015 | Rebinsky |
| 9,541,606 B2 * | 1/2017 | Neti .................... G01M 13/045 |
| 10,619,329 B2 | 4/2020 | Yoshikawa et al. |
| 10,783,723 B2 | 9/2020 | Richard et al. |
| 11,462,058 B2 * | 10/2022 | Zhang ..................... G07C 5/006 |
| 11,572,116 B2 * | 2/2023 | Hoyt ...................... B62D 55/30 |
| 11,591,758 B2 * | 2/2023 | Hedrington ......... E01C 19/4873 |
| 11,704,942 B2 * | 7/2023 | Zhang ..................... G07C 5/006 |
| | | 701/29.4 |
| 2015/0081166 A1 | 3/2015 | Diekevers et al. |
| 2015/0337522 A1 | 11/2015 | Diekevers et al. |

(Continued)

FOREIGN PATENT DOCUMENTS

CN    110849616    2/2020
WO    2016/157647 A1    10/2016

OTHER PUBLICATIONS

Written Opinion and International Search Report for Int'l. Patent Appln. No. PCT/US2022/080902, dated Apr. 18, 2023 (25 pgs).

*Primary Examiner* — Andrew Joseph Rudy

(57) ABSTRACT

A controller may receive, from a sensor device of a machine, machine drivetrain data indicating a load, on a drivetrain of the machine, over a period of time. The controller may detect, based on the machine drivetrain data, one or more occurrences of a decrease in the load during the period of time. The controller may determine that the one or more occurrences, of the decrease in the load, are unexpected. The controller may detect wear of a component of an undercarriage of the machine based on determining that the one or more occurrences, of the decrease in the load, are unexpected. The controller may cause an action to be performed based on determining the wear of the component.

20 Claims, 3 Drawing Sheets

(56) References Cited

U.S. PATENT DOCUMENTS

| | | | |
|---|---|---|---|
| 2017/0356164 A1* | 12/2017 | Recker | E02F 9/2054 |
| 2020/0070906 A1 | 3/2020 | Laperle et al. | |
| 2020/0262415 A1* | 8/2020 | Schmidt | H04W 4/40 |
| 2021/0173399 A1 | 6/2021 | Richard et al. | |
| 2022/0198842 A1* | 6/2022 | Agarwal | G07C 5/008 |
| 2023/0135656 A1* | 5/2023 | Mhadbi | E02F 9/2054 |
| | | | 701/31.4 |
| 2023/0193597 A1* | 6/2023 | Johannsen | G05B 23/02 |
| | | | 701/50 |

* cited by examiner

DETECTING SPROCKET SEGMENT WEAR BASED ON MACHINE DRIVETRAIN DATA

TECHNICAL FIELD

The present disclosure relates generally to detecting wear of a sprocket segment and, for example, to detecting wear of a sprocket segment based on machine drivetrain data.

BACKGROUND

Components of an undercarriage of a machine wear over a period of time. The components may include sprocket segments of a sprocket, track links, bushings, and/or track link pins. With respect to a sprocket segment of a sprocket, as the sprocket segment wears, a width of a tip of the sprocket segment decreases. As the width of the tip of the sprocket segment decreases, a frequency of track indexing events increases. "Track indexing event" may refer to a bushing (of a track link), engaged by the sprocket segment, moving to another sprocket segment of the sprocket due to the wear of the sprocket segment (e.g., due to the wear of the tip of the sprocket segment). Track indexing events may damage the undercarriage of the machine and/or damage one or more other components associated with the machine. Additionally, track indexing events may reduce a measure of productivity of the machine.

One technique for detecting wear of the components includes obtaining manual measurements of dimensions of such components. The manual measurements may be compared against specified dimensions of the components. In order to obtain the manual measurements, the machine is required to suspend performing a task at a work site. Because obtaining manual measurements requires the machine to suspend performing the task and is a time-consuming process (e.g., due to the travel time for obtaining manual measurements and/or the amount of time for obtaining the manual measurements), obtaining manual measurements may negatively affect productivity at the work site. In this regard, the task (that is to be performed or that is being performed by the machine) may be suspended for a long period of time (e.g., a period of time during which the manual measurements are obtained).

Additionally, such manual measurements can be inaccurate. Inaccurate measurements of component dimensions, in turn, may result in incorrect predictions regarding an amount of wear of the components. As a result of such incorrect predictions, the components may either fail prematurely or may be repaired or replaced prematurely (e.g., because the components may not be sufficiently worn to require replacement or repair). Such premature failure of the components or premature replacement or repair of the components may also negatively affect productivity at the work site.

U. S. Patent Application Publication No. 20210173399 (the '399 publication) discloses a vehicle (e.g., an agricultural vehicle or other off-road vehicle) comprising a track system that can be monitored to obtain information regarding the vehicle. The '399 publication further discloses that the information regarding the vehicle includes information regarding the track system, such as one or more parameters (e.g., a temperature, a pressure, an acceleration, an identifier, etc.) of the track system and/or one or more characteristics of an environment of the track system (e.g., a compliance, a profile, a soil moisture level, etc. of the ground beneath the track system), which can be used for various purposes.

While the '399 publication discloses that a track system can be monitored to obtain information regarding a vehicle, the '399 publication does not disclose detecting wear of a sprocket segment of a sprocket or detecting track indexing events resulting from the wear of the sprocket segment.

The controller of the present disclosure solves one or more of the problems set forth above and/or other problems in the art.

SUMMARY

A machine includes a drivetrain; an undercarriage including track links and one or more components associated with the drivetrain; a sensor device configured to generate machine drivetrain data indicating a load on the drivetrain over a period of time; and a controller configured to: detect, based on the machine drivetrain data, one or more occurrences of a decrease in the load during the period of time; determine that the one or more occurrences, of the decrease in the load, are unexpected; detect wear of the one or more components of the undercarriage based on determining that the one or more occurrences, of the decrease in the load, are unexpected; and cause an action to be performed based on detecting the wear of the one or more components.

A method performed by a controller includes receiving, from a sensor device of a machine, machine drivetrain data indicating a load, on a drivetrain of the machine, over a period of time; detecting, based on the machine drivetrain data, one or more occurrences of a decrease in the load during the period of time; determining that the one or more occurrences, of the decrease in the load, are unexpected; detecting wear of a component of an undercarriage of the machine based on determining that the one or more occurrences, of the decrease in the load, are unexpected; and causing an action to be performed based on determining the wear of the component.

A system includes a sensor device configured to generate machine drivetrain data indicating a load on a drivetrain, of a machine, over a period of time; and a controller configured to: detect, based on the machine drivetrain data, one or more occurrences of a decrease in the load during the period of time; determine that the one or more occurrences, of the decrease in the load, are unexpected; detect wear of a component of an undercarriage of the machine based on determining that the one or more occurrences, of the decrease in the load, are unexpected; and cause an action to be performed based on detecting the wear of the component.

DETAILED DESCRIPTION

Implementations described herein are directed to detecting wear of a tip of a sprocket segment of sprocket based on a frequency of track indexing events. For example, a controller may obtain machine drivetrain data indicating a load on the drivetrain over a period of time. The controller may analyze the machine drivetrain data to detect occurrences, of a decrease in the load, that are unexpected (e.g., occurrences of sudden decrease in the load). In some situations, the controller may determine that the occurrences are unexpected based on determining that a steering command and/or a change of gear was not detected during the occurrences of the decrease in the load.

In some examples, the controller may obtain machine velocity data indicating a velocity of the machine over the period of time. The controller may analyze the machine velocity data to detect occurrences, of an increase in the velocity, that are unexpected (e.g., occurrences of sudden increase in the velocity). The occurrences of the increase in the velocity may be determined in a manner similar to the manner described above in connection with determining the occurrences of the decrease in the load. Based on detecting the occurrences of unexpected decrease in the load and/or the occurrences of unexpected increase in the velocity, the controller may determine that track indexing events are occurring.

In some examples, the controller may determine a quantity of the occurrences of unexpected decrease in the load and/or a quantity of the occurrences of unexpected increase in the velocity. Based on one or more of the quantities, the controller may detect a frequency of the track indexing events. The controller may detect the wear of the sprocket segment of the sprocket (e.g., the wear of the tip of the sprocket segment) based on the frequency of track indexing events. For example, the controller may determine that the frequency of track indexing events is increasing and, accordingly, detect the wear of the sprocket segment of the sprocket. In some situations, the controller may determine the frequency of the track indexing events in real time or near real time.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
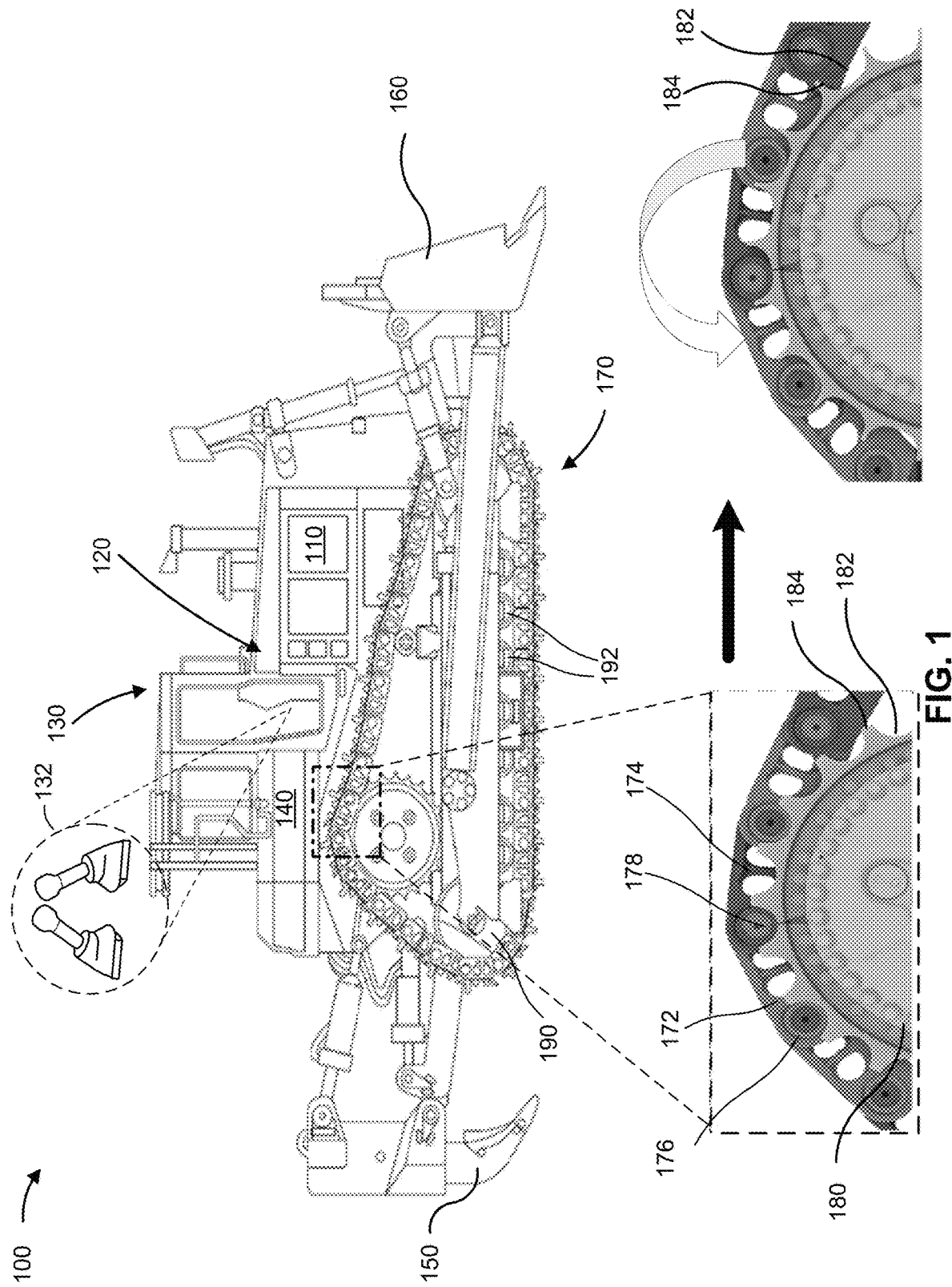
FIG. 1 is a diagram of an example implementation described herein.

FIG. 1 is a diagram of an example machine 100 described herein. As shown in FIG. 1, machine 100 is embodied as an earth moving machine, such as a dozer. Alternatively, machine 100 may be another type of track-type machine such as an excavator.

As shown in FIG. 1, machine 100 includes an engine 110, a sensor system 120, an operator cabin 130, operator controls 132, a controller 140, a rear attachment 150, a front attachment 160, ground engaging members 170, sprocket 180, one or more idlers 190, and one or more rollers 192.

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100. For example, engine 110 may provide power to one or more control systems (e.g., controller 140), sensor system 120, operator cabin 130, and/or ground engaging members 170.

Engine 110 can provide power to an implement of machine 100, such as an implement used in mining, construction, farming, transportation, or any other industry. For example, engine 110 may power components (e.g., one or more hydraulic pumps, one or more actuators, and/or one or more electric motors) to facilitate control of rear attachment 150 and/or front attachment 160 of machine 100.

Sensor system 120 may include sensor devices that are capable of generating signals regarding an operation of machine 100. The sensor devices, of sensor system 120, may include a load sensor device, a velocity sensor device, a torque sensor device, a vibration sensor device, a motion sensor device, among other examples. As an example, the sensor devices may include one or more inertial measurement units (IMUs).

Operator cabin 130 includes an integrated display (not shown) and operator controls 132. Operator controls 132 may include one or more input components (e.g., integrated joysticks, push-buttons, control levers, and/or steering wheels) to control an operation of machine 100. For example, operator controls 132 may be used to control an operation of one or more implements of machine 100 (e.g., rear attachment 150 and/or front attachment 160) and/or control an operation of ground engaging members 170.

For an autonomous machine, operator controls 132 may not be designed for use by an operator and, rather, may be designed to operate independently from an operator. In this case, for example, operator controls 132 may include one or more input components that provide an input signal for use by another component without any operator input.

Controller 140 (e.g., an electronic control module (ECM)) may control and/or monitor operations of machine 100. For example, controller 140 may control and/or monitor the operations of machine 100 based on signals from operator controls 132 and/or from sensor system 120. Controller 140 may determine an amount of wear of one or more components of machine 100 based on the signals from sensor system 120 and/or from operator controls 132, as described in more detail below.

Rear attachment 150 may include a ripper assembly, a winch assembly, and/or a drawbar assembly. Front attachment 160 may include a blade assembly. Ground engaging members 170 may be configured to propel machine 100. Ground engaging members 170 may include wheels, tracks, rollers, and/or similar components, for propelling machine 100. Ground engaging members 170 may include an undercarriage that includes tracks (as shown in FIG. 1). The tracks may include track links. In some situations, track link may include a track link bushing and a track link pin. As an example, the tracks may include a first track link 172 and a second track link 174. First track link 172 includes a first track link bushing 176 and a first track link pin 178.

Sprocket 180 may include one or more sprocket segments 182 (referred to herein individually as "sprocket segment 182," and collectively as "sprocket segments 182"). Sprocket 180 may be configured to engage with ground engaging members 170 and to drive ground engaging members 170. For example, sprocket segments 182 may be configured to engage track link bushings (e.g., of the tracks of ground engaging members 170) and rotate to cause the tracks to propel machine 100. Sprocket 180 may be included in a drivetrain of machine 100.

In some situations, a sprocket segment 182 may experience wear. As shown in FIG. 1, for example, as the sprocket segment 182 experiences wear, a width of a tip 184 of the sprocket segment 182 may decrease. As the width of tip 184 of the sprocket segment 182 decreases, a track indexing event may occur. As shown in FIG. 1, for example, a track indexing event may occur when a bushing, engaged by the sprocket segment 182, moves to another sprocket segment 182 due to the wear of the sprocket segment 182. A frequency of track indexing events may increase, over a period of time, as the width of tip 184 of the sprocket segment 182 continues to decrease. Controller 140 may determine the frequency of track index events and, accordingly, detect wear of the sprocket segment 182, as described in more detail below.

In some examples, one or more idlers 190 and/or one or more rollers 192 may guide the tracks as the tracks rotate to propel machine 100. In some examples, ground engaging members 170, sprocket 180, one or more idlers 190, and one or more rollers 192 may be components of the undercarriage. The undercarriage may further include one or more track pads and/or one or more track shoes.

As indicated above, FIG. 1 is provided as an example. Other examples may differ from what was described in connection with FIG. 1.

Figure 2:
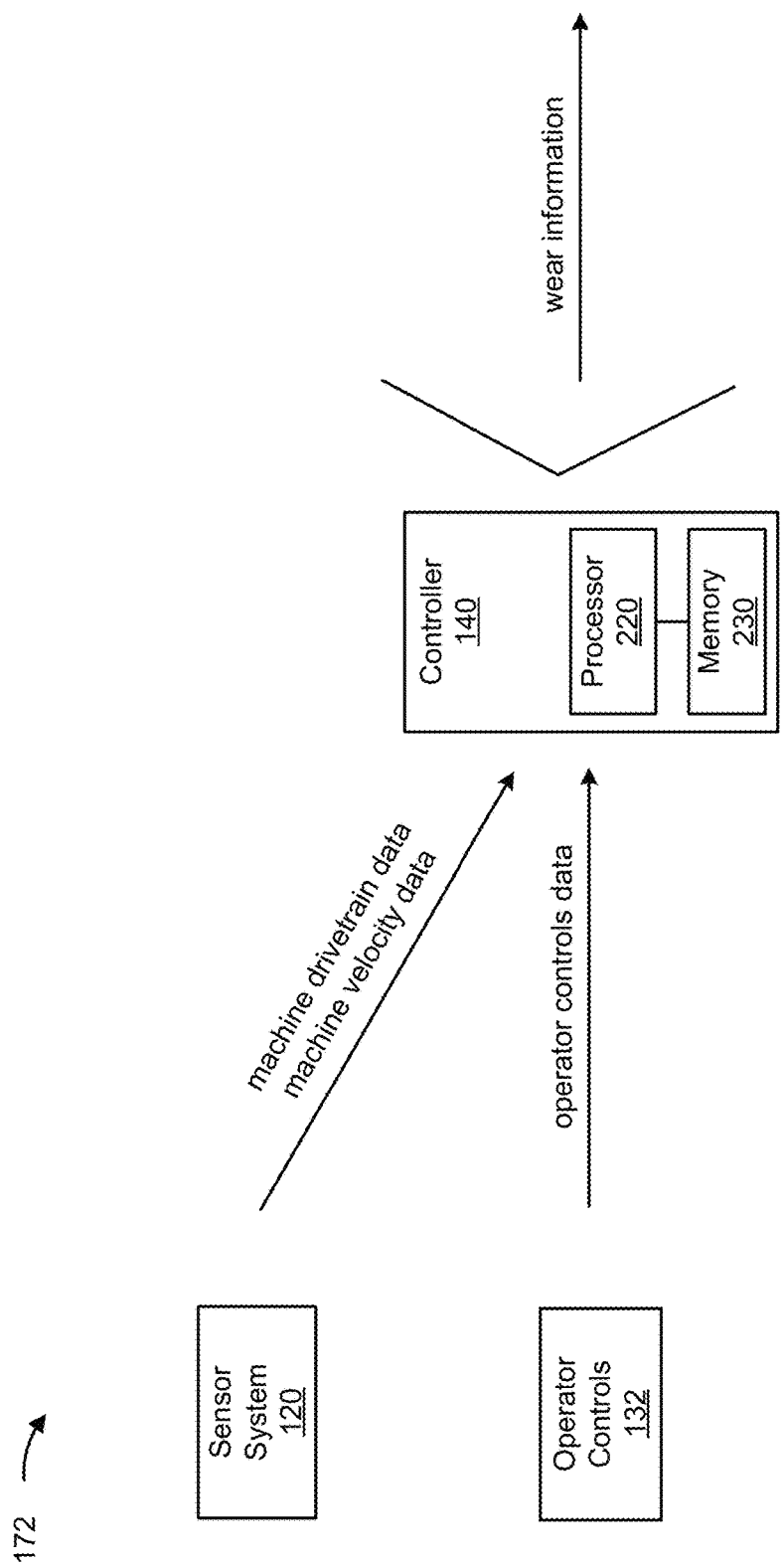
FIG. 2 is a diagram of an example system described herein.

FIG. 2 is a diagram of an example system 200 described herein. As shown in FIG. 2, system 200 includes sensor system 120, operator controls 132, and a controller 140. In some situations, controller 140 may be included in machine 100. Alternatively, controller 140 may be included in a device that is part of a site management system (e.g., of a work site associated with machine 100). In some implementations, the device may be implemented by one or more computing resources of a cloud computing environment. For example, the device may be hosted in the cloud computing environment. Alternatively, the device may be non-cloud-based or may be partially cloud-based. Alternatively to controller 140 being included in the device of the site management system, controller 140 may be included in a device that is part of a back office system.

Sensor system 120 may include sensor devices that generate sensor data that may be used to detect wear and/or an amount of wear of one or more components of the undercarriage. The one or more components may include one or more sprockets 180, one or more sprocket segments 182, one or more tracks, one or more track links such as first track link 172 and/or second track link 174, one or more track link bushings such as first track link bushing 176, one or more track link pins such as first track link pin 178, and/or one or more idlers 190.

The sensor data may include data indicating a load on the drivetrain of machine 100, data indicating an amount of torque generated by the drivetrain of machine 100, and/or data indicating a velocity of machine 100, as explained below. The sensor data may be used (e.g., by controller 140) to detect track indexing events and determine wear of the one or more components based on a frequency of the track indexing events. In some instances, the sensor data may include timestamps associated with the sensor data (e.g., information identifying times at which and/or dates on which the sensor data was generated).

Sensor system 120 may provide the sensor data, to controller 140, to detect wear and/or an amount of wear of one or more components of the undercarriage, as explained in more detail below. In some examples, sensor system 120 may provide the sensor data to controller 140 periodically (e.g., every hour, every other hour, and/or every work shift). Additionally, or alternatively, sensor system 120 may provide the sensor data to controller 140 based on a triggering event (e.g., based on a request from controller 140, and/or a request from an operator of machine 100 (e.g., via the integrated display and/or operator controls)).

The sensor devices, of sensor system 120, may include a load sensor device, a torque sensor device, a velocity sensor device, a vibration sensor device, among other examples of sensor devices that provide sensor data that may be used to detect wear of the one or more components. The load sensor device may include one or more devices that sense a load on the drivetrain of machine 100 and generate machine drivetrain data indicating loads on the drivetrain as measured at various times over a period of time. The torque sensor device may include one or more devices that sense an amount of torque generated by the drivetrain and generate machine torque data indicating the amounts of torque generated by the drivetrain as measured at various times over the period of time. In some instances, the torque sensor device may be included in the load sensor device and the machine drivetrain data may include the machine torque data.

The velocity sensor device may include one or more devices that sense a velocity of machine 100 and generate machine velocity data indicating the velocities of machine 100 as measured at various times over the period of time. The velocity sensor device may sense engine speed of engine 110, track speed of the undercarriage, an acceleration of machine 100, among other examples. The vibration sensor device may include one or more devices that sense a vibration of machine 100 and generate machine vibration data based on the vibration. As an example, the vibration sensor device may include one or more inertial measurement units (IMUs). The machine vibration data may indicate a measure of vibration of machine 100 over the period of time.

Operator controls 132 may include one or more devices that are capable of generating operator controls data that is used to control an operation of machine 100. For example, operator controls 132 may be used to control an operation of one or more implements of machine 100 (e.g., rear attachment 150 and/or front attachment 160) and/or control an operation of ground engaging members 170 (e.g., to change gears of machine 100, to change a direction of machine 100, among other examples).

The operator controls data may include implement command data identifying a command for controlling the one or more implements, include steering command data identifying a steering command of machine 100, and/or include gear setting data identifying a gear setting of machine 100 and/or identifying a gear change. Operator controls 132 may provide the operator controls data (e.g., to controller 140) on a periodic basis and/or based on a triggering event, in a manner similar to the manner described above in connection with sensor system 120.

As shown in FIG. 2, controller 140 may include one or more processors 220 (referred to herein individually as "processor 220," and collectively as "processors 220"), and one or more memories 230 (referred to herein individually as "memory 230," and collectively as "memories 230"). A processor 220 is implemented in hardware, firmware, and/or a combination of hardware and software. Processor 220 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 220 may be capable of being programmed to perform a function.

Memory 230 includes a random-access memory (RAM), a read only memory (ROM), and/or another type of dynamic or static storage device (e.g., a flash memory, a magnetic memory, and/or an optical memory) that stores information and/or instructions for use by a processor 220 to perform a function. For example, when performing the function, controller 140 may detect track indexing events and detect wear and/or an amount of wear of the one or more components of the undercarriage based on the track indexing events.

As shown in FIG. 2, controller 140 may receive the sensor data from sensor system 120 and/or the operator controls data from operator controls 132. The sensor data may include the machine drivetrain data generated by the load sensor device and/or the machine velocity data generated by the velocity sensor device. Controller 140 may receive the sensor data and analyze the sensor data.

Based on analyzing the machine drivetrain data, controller 140 may detect one or more occurrences of a decrease in the load during the period of time (e.g., one or more occurrences of sudden decrease in the load). Controller 140 may determine whether the one or more occurrences, of the decrease in the load, are unexpected. In some situations, controller 140 may determine whether the one or more occurrences, of the decrease in the load, are unexpected based on the operator controls data. For example, controller 140 may identify a time interval (during the period of time) during which the one or more occurrences (of the decrease in the load) occurred and may determine whether the operator controls data was generated during the time interval.

For instance, controller 140 may determine whether the steering command data was generated during the time interval, whether the gear setting data was generated during the time interval, and/or whether the implement control data was generated during the time interval. In other words, controller 140 may determine whether one or more steering commands were detected during the time interval, whether one or more gear changes were detected during the time interval, whether one or more commands (for controlling the one or more implements) were detected during the time interval, among other examples.

Controller 140 may determine that the one or more occurrences, of the decrease in the load, are unexpected based on controller 140 determining that a steering command was not detected during the time interval, determining that a gear change was not detected during the time interval, and/or determining that a command (for controlling the one or more implements) was not detected during the time interval. Controller 140 may perform similar actions to determine that one or more occurrences, of a decrease in a torque generated by the drivetrain, are unexpected. For example, controller 140 may analyze the machine torque data and the operator controls data to determine that the one or more occurrences, of the decrease in the torque generated by the drivetrain, are unexpected.

In addition to analyzing the machine drivetrain data, controller 140 may analyze the machine velocity data. In some implementations, based on analyzing the machine velocity data, controller 140 may detect one or more occurrences of an increase in the velocity during the time interval (e.g., one or more occurrences of sudden increase in the velocity). Controller 140 may determine that the one or more occurrences, of the increase in the velocity, are unexpected in a manner similar to determining that the one or more occurrences, of the decrease in the load, are unexpected. The unexpected one or more occurrences of the decrease in the load, the unexpected one or more occurrences of the decrease in the torque, and/or the unexpected one or more occurrences of the increase in the velocity may collectively be referred to as "unexpected occurrences." Controller 140 may detect one or more track indexing events based on the one or more unexpected occurrences. In other words, the one or more unexpected occurrences may indicate that one or more track indexing events have occurred.

Controller 140 may determine a frequency of track indexing events based on a quantity of the unexpected occurrences. For example, controller 140 may determine whether a first quantity, of the unexpected occurrences during the period of time, exceeds a second quantity of the unexpected occurrences during a previous period of time that precedes the period of time. Controller 140 may determine that the frequency of track indexing events is increasing based on the first quantity exceeding the second quantity. Based on determining that the frequency of the one or more track indexing events is increasing, controller 140 may detect wear of the one or more components. In other words, controller 140 may detect wear of the one or more components based on the first quantity exceeding the second quantity.

In some situations, controller 140 may detect an amount of wear of the one or more components based on a quantity of the one or more unexpected occurrences. For example, controller 140 may detect a first amount of wear of the one or more components based on a third quantity of the one or more unexpected occurrences, detect a second amount of wear of the one or more components based on a fourth quantity of the one or more unexpected occurrences, and so on. The second amount of wear may exceed the first amount of wear based on the fourth quantity exceeding the third quantity.

Controller 140 may cause an action to be performed based on detecting the wear of the one or more components. In some examples, controller 140 may determine whether a quantity of the one or more unexpected occurrences satisfies a quantity threshold prior to causing the action to be performed. For instance, controller 140 may cause the action to be performed based on determining that the quantity of the one or more unexpected occurrences satisfies the quantity threshold.

In some situations, the action may include controller 140 causing an adjustment of an operation of machine 100 based on the wear of the one or more components (e.g., when the amount of wear satisfies a wear threshold). For instance, controller 140 may cause a change of a speed of machine 100, a change of acceleration of machine 100, a change of travel direction of machine 100, a change of implement command, a change of steering command, a change of gear setting, and/or another operation that may reduce a wear rate of the one or more components and prolong the time until the one or more components have to be repaired or replaced.

Controller 140 may cause machine 100 to navigate to a different work site and to perform one or more tasks at the different work site, in an effort to extend the life of the one or more components. For example, the different work site may be associated with a wear rate (of the one or more components) that is less than a wear rate (of the one or more components) associated with a work site where machine 100 is currently located. Additionally, or alternatively, controller 140 may cause machine 100 to perform a different task in an effort to extend the life of the one or more components. For example, the different task may be associated with a wear rate (of the one or more components) that is less than a wear rate (of the one or more components) associated with a task that machine 100 is currently performing.

The action may include controller 140 providing a notification indicating that the wear of the component has been detected. In some instances, providing the notification may include transmitting wear information to one or more devices that monitor an amount of wear of components of a plurality of machines (e.g., including machine 100). In some examples, controller 140 may transmit the wear information when the amount of wear (of the one or more components) satisfies the wear threshold. The wear information may indicate the amount of wear of the one or more components, indicate a wear rate of the one or more components, and/or indicate an offer associated with repairing and/or replacing the one or more components. In some implementations, the wear rate may be based on a change in frequency of unexpected occurrences. For example, the wear rate may increase as the frequency increases and may decrease as the frequency decreases. The one or more devices may include a device of the site management system, a device of the back office system, a device associated with the operator of machine 100, a device associated with a technician, and/or a controller of machine 100 if controller 140 is external with respect to machine 100.

Controller 140 may transmit the wear information to cause the one or more devices to order one or more replacement components. In some instances, the wear information may include information identifying the one or more components and/or the one or more replacement components.

Controller 140 may transmit the wear information to cause the one or more devices to cause machine 100 to autonomously navigate to a repair facility. Additionally, or alternatively, controller 140 may transmit the wear information to cause the one or more devices to cause a calendar, of the technician, to be populated with a calendar event to inspect and/or repair the one or more components. Additionally, or alternatively, controller 140 may transmit the wear information to cause the one or more devices to cause an alarm to be activated. The alarm may indicate that the one or more components are to be repaired or replaced.

In some instances, controller 140 may transmit the wear information to cause the one or more devices to generate a service request to repair and/or replace the one or more components. As part of generating the service request, the one or more devices may perform one or more of the actions described herein.

In some examples, the action may include controller 140 causing a first autonomous device to deliver the one or more replacement components to a location associated with machine 100. The location may include a current location of machine 100, a location of a work site where machine 100 performs multiple tasks, a location where machine 100 is stationed when machine 100 is not performing a task, and/or a location where machine 100 is stationed when machine 100 is undergoing repair and/or replacement. In some instances, the wear information may include information identifying the location associated with machine 100.

In some examples, the action may include controller 140 causing a second autonomous device to navigate to the location associated with machine 100 to verify the amount of wear identified by the wear information. The second autonomous device may generate verification information, based on verifying the wear information, and may transmit the verification information to controller 140. Controller 140 may use the verification information to retrain the machine learning model.

In some instances, controller 140 may determine whether a failure of the one or more components is imminent (e.g., based on the amount of wear). If controller 140 determines that the failure is imminent, controller 140 may perform one or more of the actions described above. If controller 140 determines that the failure is not imminent, controller 140 may not perform an action.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
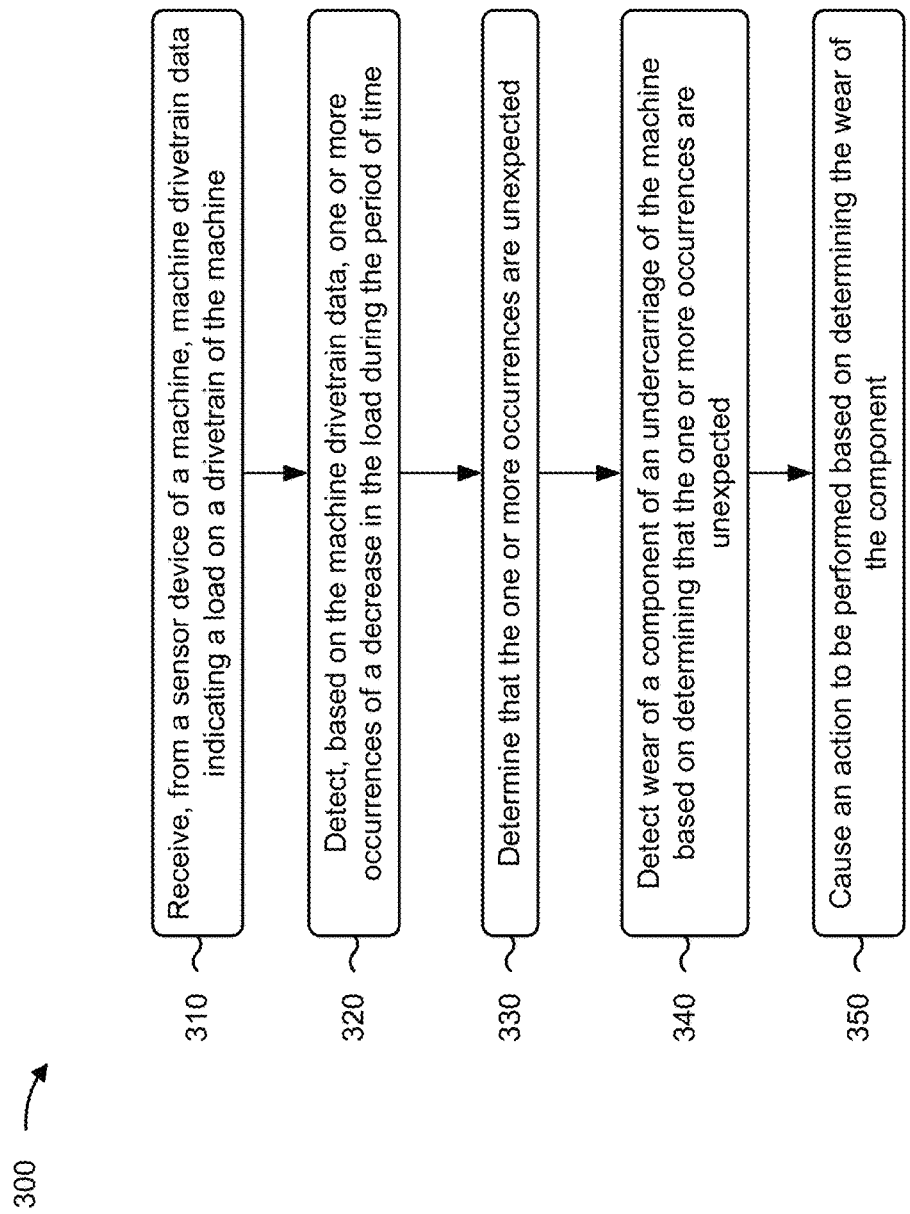
FIG. 3 is a flowchart of an example process associated with detecting sprocket segment wear based on machine drivetrain data.

FIG. 3 is a flowchart of an example process 300 associated with detecting sprocket segment wear based on machine drivetrain data. One or more process blocks of FIG. 3 may be performed by a controller (e.g., controller 140).

As shown in FIG. 3, process 300 may include receiving, from a sensor device of a machine, machine drivetrain data indicating a load, on a drivetrain of the machine, over a period of time (block 310). For example, the controller may receive, from a sensor device of a machine, machine drivetrain data indicating a load, on a drivetrain of the machine, over a period of time, as described above.

As further shown in FIG. 3, process 300 may include detecting, based on the machine drivetrain data, one or more occurrences of a decrease in the load during the period of time (block 320). For example, the controller may detect, based on the machine drivetrain data, one or more occurrences of a decrease in the load during the period of time, as described above.

As further shown in FIG. 3, process 300 may include determining that the one or more occurrences, of the decrease in the load, are unexpected (block 330). For example, the controller may determine that the one or more occurrences, of the decrease in the load, are unexpected, as described above.

In some implementations, detecting the one or more occurrences comprises detecting the one or more occurrences of the decrease in the load during one or more portions of the period of time, and process 300 includes receiving operator controls data regarding steering commands associated with operating the machine during the period of time, determining, based on the operator controls data, that a steering command was not detected during the one or more portions of the period of time, and determining that the one or more occurrences, of the decrease in the load, are unexpected based on determining that a steering command was not detected during the one or more portions of the period of time.

In some implementations, detecting the one or more occurrences comprises detecting the one or more occurrences of the decrease in the load during one or more portions of the period of time, and process 300 includes receiving operator controls data regarding gear changes associated with operating the machine during the period of time, determining, based on the operator controls data, that a gear change was detected during the one or more portions of the period of time, and determining that the one or more occurrences, of the decrease in the load, are unexpected based on determining that a gear change was detected during the portion of the period of time.

As further shown in FIG. 3, process 300 may include detecting wear of a component of an undercarriage of the machine based on determining that the one or more occurrences, of the decrease in the load, are unexpected (block 340). For example, the controller may detect wear of a component of an undercarriage of the machine based on determining that the one or more occurrences, of the decrease in the load, are unexpected, as described above. In some implementations, detecting the wear of the component comprises detecting wear of a sprocket of the undercarriage.

As further shown in FIG. 3, process 300 may include causing an action to be performed based on determining the wear of the component (block 350). For example, the controller may cause an action to be performed based on determining the wear of the component, as described above.

In some implementations, causing the action to be performed comprises at least one of providing, to a device associated with the machine, a notification indicating that the wear of the component has been detected, causing an adjustment of an operation of the machine to prevent additional wear of the component, providing an instruction to adjust the operation of the machine, or providing a service request to at least one of repair or replace the component.

In some implementations, causing the action to be performed comprises determining that a quantity of the one or more occurrences satisfies a quantity threshold, and causing the action to be performed based on determining that the quantity of the one or more occurrences satisfies the quantity threshold.

In some implementations, the sensor device is a first sensor device, wherein detecting the one or more occurrences comprises detecting the one or more occurrences of the decrease in the load during one or more portions of the period of time, wherein process 300 includes receiving, from a second sensor device of the machine, machine velocity data indicating a velocity of the machine over the period of time; detecting, based on the machine velocity data, one or more occurrences of an increase in the velocity during the one or more portions of the period of time; and determining that the one or more occurrences, of the increase in the velocity, are unexpected, and wherein detecting the wear of the component comprises detecting the wear of the component further based on determining that the one or more occurrences, of the increase in the velocity, are unexpected.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Implementations described herein are directed to detecting wear of a tip of a sprocket segment of sprocket based on a frequency of track indexing events. For example, a controller may obtain machine drivetrain data indicating a load on the drivetrain over a period of time. The controller may analyze the machine drivetrain data to detect occurrences, of a decrease in the load, that are unexpected (e.g., occurrences of sudden decrease in the load). In some situations, the controller may determine that the occurrences are unexpected based on determining that a steering command and/or a change of gear was not detected during the occurrences of the decrease in the load. The controller may determine occurrences of unexpected increase in a velocity of the machine.

Based on detecting the occurrences of unexpected decrease in the load and/or the occurrences of unexpected increase in the velocity, the controller may determine that track indexing events are occurring. In some examples, the controller may determine a quantity of the occurrences of unexpected decrease in the load and/or a quantity of the occurrences of unexpected increase in the velocity. Based on one or more of the quantities, the controller may detect a frequency of the track indexing events. The controller may detect the wear of the sprocket segment of the sprocket (e.g., the wear of the tip of the sprocket segment) based on the frequency of track indexing events.

Manual measurements of a tip of the sprocket segment may waste machine resources that are used to prevent movement of the machine while the manual measurements are obtained. Additionally, incorrect manual measurements of tracks and/or incorrect predictions of the amount of wear of the tip of the sprocket segment may waste computing resources that are used to remedy issues associated with the incorrect manual measurements and/or incorrect predictions of the amount of wear of the tip of the sprocket segment (e.g., premature failure of the sprocket segment and/or the sprocket, premature repair of the sprocket segment and/or of the sprocket, and/or premature replacement of the sprocket segment and/or of the 22 procket).

By detecting the wear of the sprocket segment of the sprocket as described herein, the controller may prevent damage to an undercarriage of the machine and/or to one or more other components associated with the undercarriage of the machine. Additionally, by detecting the wear of the sprocket segment of the sprocket in this manner, the controller may prevent a reduction of a measure of productivity of the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A machine, comprising:
a drivetrain;
an undercarriage including track links and one or more components associated with the drivetrain;
a sensor device configured to generate machine drivetrain data indicating a load on the drivetrain over a period of time; and
a controller configured to:
detect, based on the machine drivetrain data, one or more occurrences of a decrease in the load during the period of time;
determine that the one or more occurrences, of the decrease in the load, are unexpected;

detect wear of the one or more components of the undercarriage based on determining that the one or more occurrences, of the decrease in the load, are unexpected; and cause an action to be performed based on detecting the wear of the one or more components.

2. The machine of claim 1, further comprising:

one or more operator controls configured to generate operator controls data associated with controlling an operation of the machine, and wherein the controller is further configured to:

determine that the operator controls data was not generated during the period of time; and determine that the one or more occurrences of the decrease in the load are unexpected based on determining that the operator controls data was not generated during the period of time.

3. The machine of claim 1, wherein the sensor device is a first sensor device, wherein the machine further comprises:

a second sensor device configured to generate machine velocity data indicating a velocity of the machine over the period of time, and wherein the controller is further configured to:

detect, based on the machine velocity data, one or more occurrences of an increase in the velocity during the period of time;

determine that the one or more occurrences, of the increase in the velocity, are unexpected; and detect the wear of the one or more components of the undercarriage further based on determining that the one or more occurrences, of the increase in the velocity, are unexpected.

4. The machine of claim 1, wherein the one or more occurrences during the period of time are one or more first occurrences during a first period of time, and wherein the controller is further configured to:

determine that a first quantity of the one or more first occurrences, during the first period of time, exceeds a second quantity of one or more second occurrences, of the decrease in the load, during a second period of time that precedes the first period of time; and detect the wear of the one or more components of the undercarriage based on determining that the first quantity exceeds the second quantity.

5. The machine of claim 1, wherein the one or more components of the undercarriage comprise one or more sprocket segments of a sprocket of the undercarriage.

6. The machine of claim 1, wherein the controller, to detect the wear of the one or more components of the undercarriage, is configured to:

detect a first amount of wear of the one or more components based on a first quantity of the one or more occurrences during the period of time; and detect a second amount of wear of the one or more components based on a second quantity of the one or more occurrence during the period of time, wherein the second quantity exceeds the first quantity, and wherein the second amount of wear exceeds the first amount of wear.

7. The machine of claim 1, wherein the controller, to cause the action to be performed, is configured to at least one of:

provide, to a device associated with the machine, a notification that the wear of the one or more components has been detected;

cause an operation of the machine to be adjusted based on detecting of the wear of the one or more components;

cause the one or more components to be serviced; or cause the one or more components to be replaced.

8. A method performed by a controller, the method comprising:

receiving, from a sensor device of a machine, machine drivetrain data indicating a load, on a drivetrain of the machine, over a period of time;

detecting, based on the machine drivetrain data, one or more occurrences of a decrease in the load during the period of time;

determining that the one or more occurrences, of the decrease in the load, are unexpected;

detecting wear of a component of an undercarriage of the machine based on determining that the one or more occurrences, of the decrease in the load, are unexpected; and causing an action to be performed based on determining the wear of the component.

9. The method of claim 8, wherein detecting the one or more occurrences comprises:

detecting the one or more occurrences of the decrease in the load during a time interval of a period of time, and wherein the method further comprises:

receiving operator controls data regarding steering commands associated with operating the machine during the period of time;

determining, based on the operator controls data, that a steering command was not detected during the time interval of the period of time; and determining that the one or more occurrences, of the decrease in the load, are unexpected based on determining that a steering command was not detected during the period of time.

10. The method of claim 8, wherein detecting the one or more occurrences comprises:

detecting the one or more occurrences of the decrease in the load during a time interval of the period of time, and wherein the method further comprises:

receiving operator controls data regarding gear changes associated with operating the machine during the period of time;

determining, based on the operator controls data, that a gear change was detected during the time interval of the period of time; and determining that the one or more occurrences, of the decrease in the load, are unexpected based on determining that a gear change was detected during the portion of the period of time.

11. The method of claim 8, wherein detecting the wear of the component comprises:

detecting wear of a sprocket of the undercarriage.

12. The method of claim 8, wherein causing the action to be performed comprises at least one of:

providing, to a device associated with the machine, a notification indicating that the wear of the component has been detected;

causing an adjustment of an operation of the machine to prevent additional wear of the component;

providing an instruction to adjust the operation of the machine; or providing a service request to at least one of repair or replace the component.

13. The method of claim 8, wherein the sensor device is a first sensor device,
wherein detecting the one or more occurrences comprises:
detecting the one or more occurrences of the decrease in the load during a time interval of the period of time, and
wherein the method further comprises:
receiving, from a second sensor device of the machine, machine velocity data indicating a velocity of the machine over the period of time;
detecting, based on the machine velocity data, one or more occurrences of an increase in the velocity during the time interval of the period of time;
determining that the one or more occurrences, of the increase in the velocity, are unexpected; and
wherein detecting the wear of the component comprises detecting the wear of the component further based on determining that the one or more occurrences, of the increase in the velocity, are unexpected.

14. The method of claim 8, wherein causing the action to be performed comprises:
determining that a quantity of the one or more occurrences satisfies a quantity threshold; and
causing the action to be performed based on determining that the quantity of the one or more occurrences satisfies the quantity threshold.

15. A system, comprising:
a sensor device configured to generate machine drivetrain data indicating a load on a drivetrain, of a machine, over a period of time; and
a controller configured to:
detect, based on the machine drivetrain data, one or more occurrences of a decrease in the load during the period of time;
determine that the one or more occurrences, of the decrease in the load, are unexpected;
detect wear of a component of an undercarriage of the machine based on determining that the one or more occurrences, of the decrease in the load, are unexpected; and
cause an action to be performed based on detecting the wear of the component.

16. The system of claim 15, wherein the controller, to detect the wear of the component, is configured to:
detect wear of a sprocket of the undercarriage.

17. The system of claim 15, wherein the controller, to cause the action to be performed, is configured to at least one of:
provide, to a device associated with the machine, a notification that the wear of the component has been detected;
cause an operation of the machine to be adjusted based on detecting of the wear of the component;
cause the component to be serviced; or
cause the component to be replaced.

18. The system of claim 15, wherein the controller, to detect the wear of the component, is configured to:
detect a first amount of wear of the component based on a first quantity of the one or more occurrences; and
detect a second amount of wear of the component based on a second quantity of the one or more occurrences, wherein the second quantity that exceeds the first quantity,
wherein the second amount of wear exceeds the first amount of wear.

19. The system of claim 15, wherein the controller, to cause the action to be performed, is configured to:
determine that a quantity of the one or more occurrences satisfies a quantity threshold; and
cause the action to be performed based on determining that the quantity of the one or more occurrences satisfies the quantity threshold.

20. The system of claim 15, wherein the one or more occurrences are detected during the period of time, and
wherein the controller is further configured to:
receive, from one or more operator controls, operator controls data associated with controlling an operation of the machine,
determine that the operator controls data was not generated during the period of time, and
determine that the one or more occurrences, of the decrease in the load, are unexpected based on determining that the operator controls data was not generated during the period of time.

* * * * *